United States Patent [19]
Narikiyo

[11] Patent Number: 5,344,069
[45] Date of Patent: Sep. 6, 1994

[54] AIR CONDITIONING APPARATUS FOR DISTRIBUTING PRIMARILY-CONDITIONED AIR TO ROOMS

[75] Inventor: Hidetoshi Narikiyo, Fujinomiya, Japan

[73] Assignee: Kabushiki Kaisha Toshiba, Kawasaki, Japan

[21] Appl. No.: 983,220

[22] Filed: Nov. 30, 1992

[30] Foreign Application Priority Data

Nov. 30, 1991 [JP] Japan .................. 3-317176

[51] Int. Cl.⁵ .................. F24F 7/00
[52] U.S. Cl. .................. 236/49.3; 236/1 B; 62/180; 62/186; 62/200; 165/22
[58] Field of Search .................. 62/160, 173, 199, 200, 62/180; 236/1 B, 49.3; 165/22, 16, 30; 237/2 B

[56] References Cited

U.S. PATENT DOCUMENTS

| | | | |
|---|---|---|---|
| 3,407,620 | 10/1968 | Lodge | 62/173 X |
| 3,482,623 | 12/1969 | Betz | 165/30 X |
| 3,951,205 | 4/1976 | Zilbermann | 165/22 X |
| 4,328,926 | 5/1982 | Hall, Jr. | 236/49.3 X |
| 4,537,245 | 8/1985 | Nishimura et al. | 165/22 |
| 4,607,789 | 8/1986 | Bowman | 236/49.3 |
| 4,644,756 | 2/1987 | Sugimoto et al. | 62/160 |
| 4,928,750 | 5/1990 | Nurczyk | 165/22 X |
| 4,997,030 | 3/1991 | Goto et al. | 236/49.3 X |
| 5,004,149 | 4/1991 | Narikiyo et al. | 236/49.3 |

FOREIGN PATENT DOCUMENTS

| | | |
|---|---|---|
| 64-57061 | 3/1989 | Japan . |
| 3-164647 | 7/1991 | Japan . |
| 714693 | 9/1954 | United Kingdom .................. 165/30 |

Primary Examiner—Harry B. Tanner
Attorney, Agent, or Firm—Cushman, Darby & Cushman

[57] ABSTRACT

Primarily-conditioned air is discharged from a heat source, and distributed into a plurality of rooms through a duct. The duct has a plurality of air passages connected to the rooms, and a damper is provided in each air passage for adjusting the flow of the primarily-conditioned air. Further, a heat exchanger is provided in each air passage, and connected to a refrigerating cycle for the heat source. The thermal load in each room is detected, and the required air flow in the room is determined based on the thermal load. The opening degree of a damper corresponding to the room is controlled on the basis of the required air flow. Each damper has an allowable minimum opening degree. When the opening degree of any damper becomes equal to the allowable minimum value, refrigerant flows into a heat exchanger corresponding to the damper, thereby correcting the temperature of the primarily-conditioned air.

2 Claims, 8 Drawing Sheets

AIR CONDITIONING APPARATUS FOR DISTRIBUTING PRIMARILY-CONDITIONED AIR TO ROOMS

BACKGROUND OF THE INVENTION

1. Field of the Invention

This invention relates to an air conditioning apparatus for distributing conditioned air into a plurality of rooms through a duct.

2. Description of the Related Art

A building or the like having a plurality of rooms uses an air conditioning apparatus for obtaining conditioned air (cool or warm air) by operating a refrigerating cycle and a fan, and supplying the air to the rooms through a duct.

U.S. Pat. No. 5,004,149 discloses such a duct-type air conditioning apparatus. The disclosed apparatus has a duct with a plurality of air passages diverging into rooms. Each air passage has a damper. The thermal load in each room is detected, and the required amount of conditioned air in the room is determined based on the detected thermal load. The opening degree of the damper is controlled based on the required amount of conditioned air, thereby supplying the same into each room.

Another duct-type air conditioning apparatus is disclosed in Published Unexamined Japanese Patent Application No. 3-164647. In this apparatus, a heat exchanger and a damper are provided in each air passage of a duct. The duct has a fan for sucking air into the duct. The sucked air is cooled or heated by the heat exchanger, thus becoming conditioned air. The conditioned air is blown into each room when the damper is open.

A multi-type air conditioning apparatus as an apparatus for performing air conditioning of a plurality of rooms is known from Published Unexamined Japanese Application No. 64-57061. This apparatus comprises a single outdoor unit and a plurality of indoor units connected to the outdoor unit, and cooling operation and heating operation can simultaneously be performed in the rooms.

Some duct-type air conditioning apparatuses have the function of limiting the allowable minimum opening degree of a damper on the basis of a change in the opening degree thereof. The allowable minimum opening degree is a minimum value required for supplying air of an amount necessary to ventilate each room.

In the apparatus having the above-described function, supply of conditioned air is continued even after the room temperature reaches an optimal value. Thus, the room temperature may excessively be reduced during cooling, and may excessively be increased during heating.

SUMMARY OF THE INVENTION

It is the object of the invention to provide an air conditioning apparatus having the function of limiting the allowable minimum opening degree of a damper, and capable of keeping the room temperature at an optimal value irrespective of the function.

An air conditioning apparatus according to the present invention includes a heat source for discharging primarily-conditioned air. An air duct is used for distributing the primarily-conditioned air. A plurality of air passages, each corresponding to one of the rooms, diverge from the primarily-conditioned from the air duct into at a corresponding one of the rooms. A plurality of dampers, each disposed in a corresponding one of the air passages, are used for adjusting an amount of the primarily-conditioned air distributed into each of the rooms by varying the opening degrees of the dampers. Opening degree-limiting means are provided for limiting each of the opening degrees to a corresponding value which is not less than a corresponding allowable minimum value.

The apparatus also includes first detection means for detecting a thermal load in each room. Second detection means are used for detecting a required flow of the primarily-conditioned air in each room on the basis of the thermal load detected by the first detection means. First control means are provided for controlling the opening degree of each damper on the basis of the required flow detected by the second detection means. A compressor is disposed in the heat source, for compressing, and discharging refrigerant. An outdoor heat exchanger is disposed in the heat source for performing heat exchange between the refrigerant and outdoor air.

The apparatus also contains an indoor heat exchanger, which is disposed in the heat source, for performing heat exchange between the refrigerant and indoor air. A plurality of air heat exchangers, each disposed in at least a corresponding one of the air passages, is provided for performing temperature adjustments and heat exchange between the refrigerant and the primarily-conditioned air distributed to each of the rooms.

A refrigerating cycle is formed in the apparatus by connecting the compressor, the outdoor heat exchanger and the indoor heat exchanger together. The air heat exchangers are connected so as to be in parallel with the indoor heat exchanger.

Second control means are provided for returning the refrigerant discharged by the compressor, back to the compressor via the outdoor heat exchanger and the indoor heat exchanger, thereby performing a cooling operation. Third control means are also provided for controlling the refrigerant discharged by the compressor so as to flow into the air heat exchangers and controlling the flow of the refrigerant via the air heat exchangers so as to join a refrigerant flow toward the indoor heat exchanger when the open degree of each damper is the allowable minimum value during the cooling operation and the thermal load detected by the first detection means is in an excessive reduction state.

The apparatus also included pressure-reducing means for reducing the pressure of the refrigerant discharged by the compressor during a heating operation. Fourth control means are also provided for returning the refrigerant discharged by the compressor, back to the compressor via the indoor heat exchanger, the pressure-reducing means, and the outdoor heat exchanger, thereby performing the heating operation. Fifth control means are provided for controlling the refrigerant via the indoor heat exchanger so as to flow into the air heat exchangers and controlling the refrigerant via the air heat exchangers so as to return into the compressor when the open degree of each damper is the allowable minimum value during the heating operation and the thermal load detected by the first detection means is in the excessive reduction state. Finally, a sixth control means is provided for controlling an amount of the refrigerant flowing through the air heat exchangers such that each of the thermal loads detected by the first detection means is zero during one of the heating operation and the cooling operation.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE PREFERRED EMBODIMENTS

The invention will now be explained with reference to the accompanying drawings showing embodiments thereof.

Figure 1:
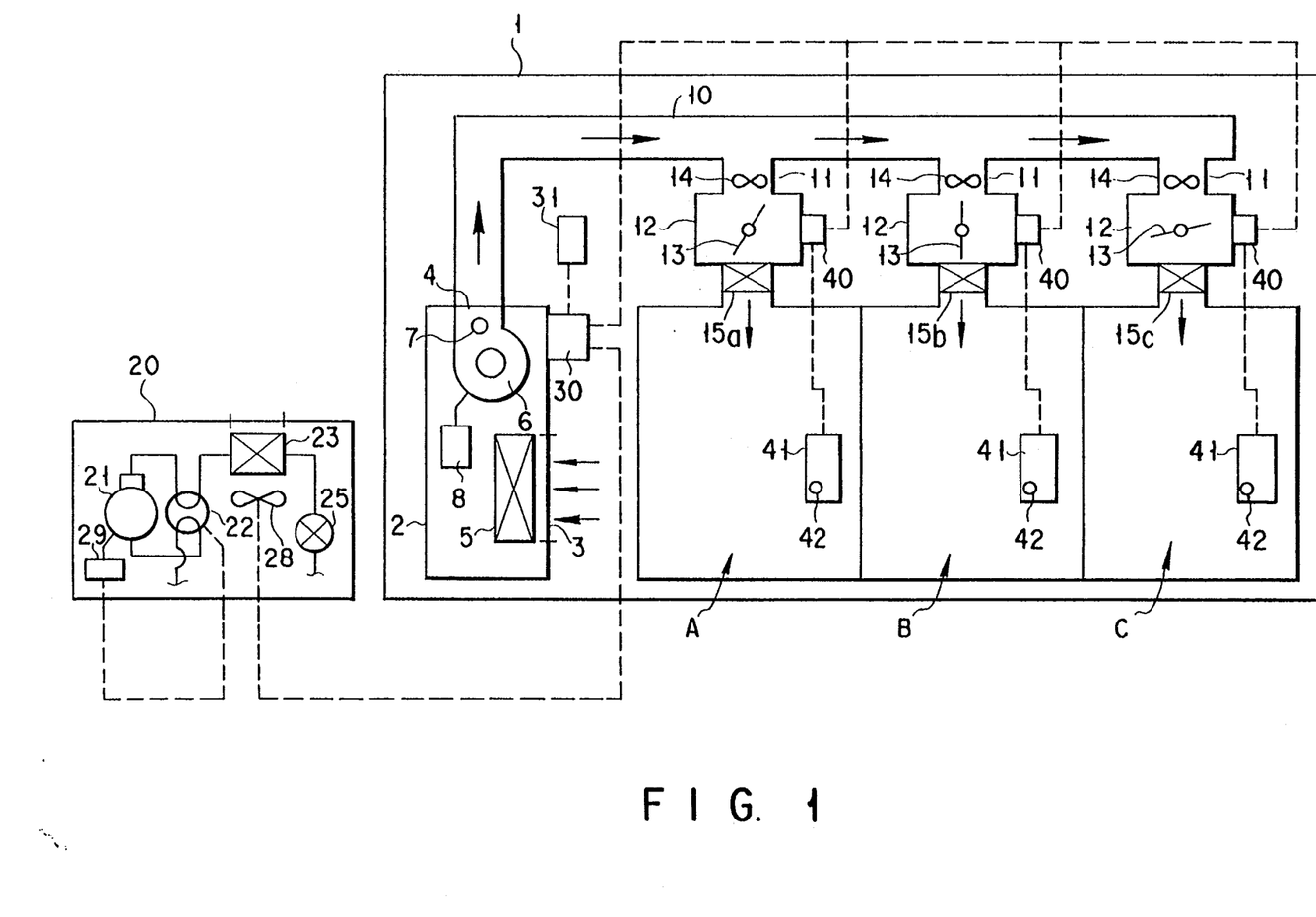
FIG. 1 is a diagram, showing the entire arrangement of an apparatus according to a first embodiment.

Referring first to FIG. 1 showing a first embodiment, a building 1 has a plurality of rooms A–C, and an indoor unit 2 is located in the building 1.

The indoor unit 2 has an air inlet 3 and an air outlet 4. An indoor heat exchanger 5 is provided in the unit 2 near the air inlet 3, and an indoor fan 6 in the unit 2 near the air outlet 4. Therefore, operation of the indoor fan 6 causes air to be sucked into the unit 2 through the air inlet 3, and then to be discharged from the unit 2 through the air outlet 4.

A temperature sensor 7 is provided in the indoor fan 6 in the vicinity of the air outlet 4, for sensing the temperature of air discharged from the air outlet. An inverter 8 for driving the indoor fan 6 is provided also in the indoor unit 2. The inverter 8 rectifies the voltage of a commercial AC power source (not shown), converts the rectified voltage to a voltage with a frequency corresponding to an instruction from a controller 30, hereinafter referred to, and outputs a resultant voltage. This voltage is used to drive the motor of the indoor fan 6. Accordingly, the speed of the fan 6 can continuously be varied by controlling the frequency F of the output voltage.

The air outlet 4 of the indoor unit 2 is connected to an end of a duct 10, which is provided for distributing primarily-conditioned air discharged from the air outlet 4, into the rooms A–C, and has a plurality of air passages 11 diverging into the rooms. The outlet end of each air passage 11 is connected to the air inlet of a corresponding one of the rooms A–C.

An air flow control unit 12 is provided across each air passage 11, and has a damper 13 and an air flow sensor 14. The damper can adjust the flow of primarily-conditioned air by varying the opening degree thereof. Each damper 13 can continuously be displaced substantially between a totally-open position and a totally-closed position.

However, the damper 13 has a predetermined allowable minimum opening degree, and cannot have an opening degree lower than the same. The allowable minimum opening degree is a minimum value required for supplying air of an amount necessary to ventilate each room.

The air flow sensor 14 has a propeller for receiving air and then generating an electric signal indicative of the rotational speed of the propeller. The output of the air flow sensor 14 is used to detect the flow of air flowing through the air passage 11.

Air heat exchangers 15a–15c serving as temperature correction means are provided across the air passages 11 downstream of the dampers 13. Each of the heat exchangers 15a–15c is disposed to correct the temperature of primarily-conditioned air flowing into a corresponding room through a corresponding damper, and to perform heat exchange between the primarily-conditioned air and refrigerant supplied from a refrigerating cycle, hereinafter referred to.

An outdoor unit 20 is located outside the building 1. The unit 20 forms a heat source, together with the indoor unit 2, and has at least a variable-capacity compressor 21, a four-way valve 22, an outdoor heat exchanger 23, an expansion valve 25 serving as pressure-reducing means, an outdoor fan 28, and an inverter 29.

The variable-capacity compressor 21 sucks refrigerant through a suction port thereof, compresses it, and discharges it through a discharge port thereof. The four-way valve 22 changes the direction of the flow of refrigerant. The outdoor heat exchanger 23 performs heat exchange between refrigerant and outdoor air. The expansion valve 25 reduces the pressure of refrigerant. The inverter 29 rectifies the voltage of the commercial AC power source, converts the rectified voltage to a voltage with a frequency corresponding to an instruction from the controller 30, hereinafter referred to, and outputs a resultant voltage. This voltage is used to drive the motor of the variable-capacity compressor 21.

The outdoor unit 21 and indoor unit 2 are connected to each other through a pipe, thereby forming a heat-pump type refrigerating cycle. This cycle is connected to the air heat exchangers 15a–15c.

Figure 2:
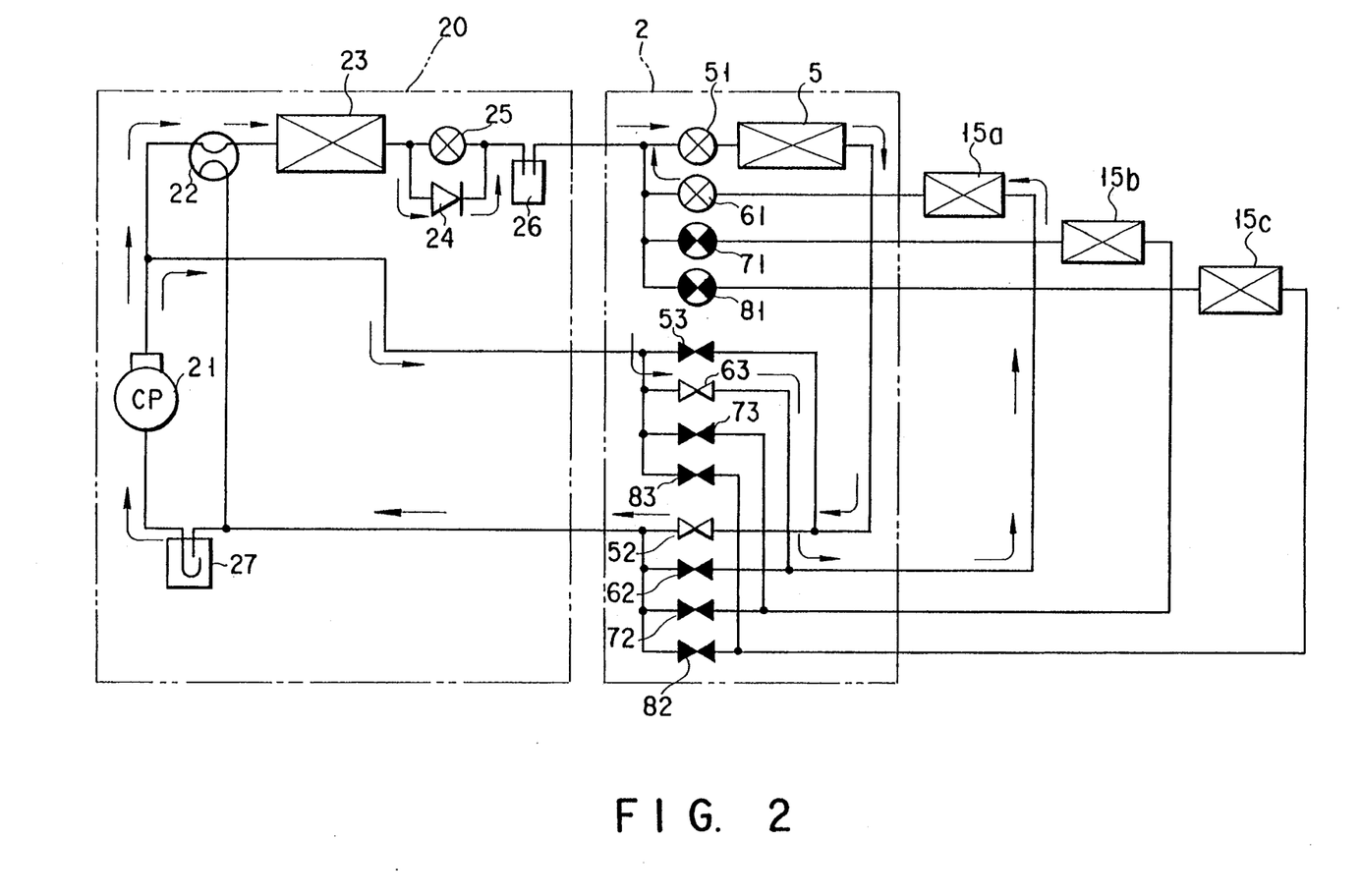
FIG. 2 is a diagram, showing the flow of a refrigerant during cooling in a refrigerating cycle employed in first and second embodiments.

FIG. 2 shows the refrigerating cycle.

The discharge port of the compressor 21 is connected to an end of the outdoor heat exchanger 23. The other end of the exchanger 23 is connected to a liquid tank 26 via a parallel circuit consisting of a check valve 24 and the expansion valve 25. The check valve 24 is provided for forming a cooling cycle, and the expansion valve 25 for heating.

The liquid tank 26 is connected to ends of the indoor heat exchanger 5 and air heat exchangers 15a–5c via flow-adjusting valves (i.e., pulse motor valves, hereinafter referred to as PMVs) 51, 61, 71, and 81, respectively. The other ends of the exchangers 5 and 5a–15c are connected to an accumulator 27 via two-way valves 52, 62, 72, and 82, respectively. An end of the indoor exchanger 23 is connected to the accumulator 27 via the four-way valve 22. The accumulator 27 is connected to the suction port of the compressor 21.

The discharge port of the compressor 21 is connected via a two-way valve 53 to a pipe interposed between the indoor heat exchanger 5 and two-way valve 52. The discharge port is also connected via a two-way valve 63 to a pipe interposed between the air heat exchanger 15a and two-way valve 62, via a two-way valve 73 to a pipe interposed between the air heat exchanger 15b and two-way valve 72, and via a two-way valve 83 to a pipe interposed between the air heat exchanger 15c and two-way valve 82.

The controller 30 is provided for the indoor unit 2, and a controller 40 for each of the air flow control unit 12.

The controller 30 comprises a microcomputer and its peripheral circuit, and is connected to the temperature sensor 7, the inverter 8, a remote-control operation unit 31, the four-way valve 22, the outdoor fan 28, the inverter 29, and the controllers 40. Further, though not shown, the controller 30 is also connected to the PMVs 51, 61, 71, and 81, and the two-way valves 52, 62, 72, 82, 53, 63, 73, and 83.

The operation unit 31 is provided for setting operating conditions such as operation modes (cooling/heating), blown-air temperature, start of operation, and stop of operation.

Each of the controllers 40 comprises a microcomputer and its peripheral circuit, and is connected to the air flow sensor 14 and an operation unit 41. The operation unit 41 has the function of setting a desired room temperature, and an indoor temperature sensor 42.

Each of the controllers 40 has the following function means:

[1] First detection means for detecting, as a thermal load, the difference $\Delta T$ between a set temperature Ts set by the operation unit 41 a detection temperature (room temperature) Ta detected by the indoor temperature sensor 42. Calculation of $\Delta T = Ta - Ts$ is performed during cooling, whereas calculation of $\Delta T = Ts - Ta$ is performed during heating.

[2] Second detection means for calculating the required flow wn of air in a room on the basis of the thermal load $\Delta T$ detected by the first detection means.

[3] Third detection means for detecting the opening degree Q of the damper 13 corresponding to the required flow Wn detected by the second detection means.

[4] Driving means for driving the damper 13 so as to make the opening degree thereof equal to the value Q detected by the third detection means.

[5] Opening degree limiting means for limiting the opening degree of the damper 13 so that the opening degree will not become lower than an allowable minimum value Qmin.

[6] Fourth detection means for detecting the flow Wa of air in the air passage 11 on the basis of the output of the air flow sensor 14.

[7] Transmission means for transmitting to the controller 30 the detected thermal load $\Delta T$, required air flow Wn, opening degree Q, and air flow Wa.

The controller 30 has the following function means:

[1] Control means for controlling, on the basis of operation of the operation unit 31, operation of the compressor 21 (driving the inverter 29), operation of the outdoor fan 28, changeover of the four-way valve 22, and operation of the indoor fan 6 (driving the inverter 8).

[2] Detection means for detecting, as a total thermal load, the difference between a blown-air temperature set by the operation unit 31 and a detection temperature detected by the temperature sensor 7.

[3] Control means for controlling the capacity of the compressor 21 (i.e., the frequency of the output of the inverter circuit 29) on the basis of the detected total thermal load.

[4] Calculation means for calculating the sum Wno of the required air flows Wn determined by the controllers 40.

[5] Calculation means for calculating the sum wao of the air flows determined by the controllers 40.

[6] Calculation means for calculating the difference $\Delta W$ ($=$Wno$-$Wao) between the calculated total required air flow Wno and total air flow Wao.

[7] Control means for controlling the speed of the indoor fan 6 (i.e., the output frequency F of the inverter 8) so as to make the difference $\Delta W$ zero.

[8] Control means for operating when any opening degree(s) detected by the controllers 40 is equal to the allowable minimum value Qmin, and when the thermal load $\Delta T$ in a room with the opening degree Qmin is excessively reduced and lower than zero, to flow refrigerant into the air heat exchanger 15a, 15b, or 15c corresponding to the room. That is, the exchangers 15a–15c serve to correct the temperatures in the rooms.

[9] Control means for controlling the flow of refrigerant so as to make the thermal load $\Delta T$ zero when it flows into the air heat exchanger 15a, 15b, or 15c. That is, the temperature correction amount of the exchanger 15a, 15b or 15c is controlled so that excessive reduction in thermal load $\Delta T$ could be released.

Then, the operation of the air conditioning apparatus constructed as above will be explained.

Suppose that the operation unit 31 selects the cooling operation mode, sets a desired blown-air temperature, and causes the apparatus to start.

Then, the outdoor unit 21 and indoor unit 2 start to operate, and refrigerant flows in a direction indicated by the arrow shown in FIG. 2, thus carrying out cooling operation. Specifically, refrigerant gas is discharged from the compressor 21, and flows into the outdoor heat exchanger 23 via the four-way valve 22. In the heat exchanger 23, refrigerant gas releases its heat and condenses into liquid.

The refrigerant liquid from the heat exchanger 23 flows into the indoor heat exchanger 5 via the check valve 24, liquid tank 26, and PMV 51. In the heat exchanger 5, the refrigerant liquid obtains heat from the air in a room and evaporates into gas. The refrigerant gas from the heat exchanger 5 is supplied to the compressor 21 via the two-way valve 52 and accumulator 27.

Thus, cooled air as primarily-conditioned air is blown into the duct 10 through the air outlet 4 of the indoor unit 2, and is distributed from the duct into the rooms A, B, and C.

The temperature of the air discharged from the indoor unit 2 is sensed by the temperature sensor 7, and the difference between the sensed temperature and a desired blown-air temperature set by the operation unit 31 is determined as a total thermal load. The capacity of the compressor 21 (i.e., the output frequency of the inverter circuit 29) is controlled based on the total thermal load, thereby varying the temperature of blown air toward the set temperature.

Figure 3:
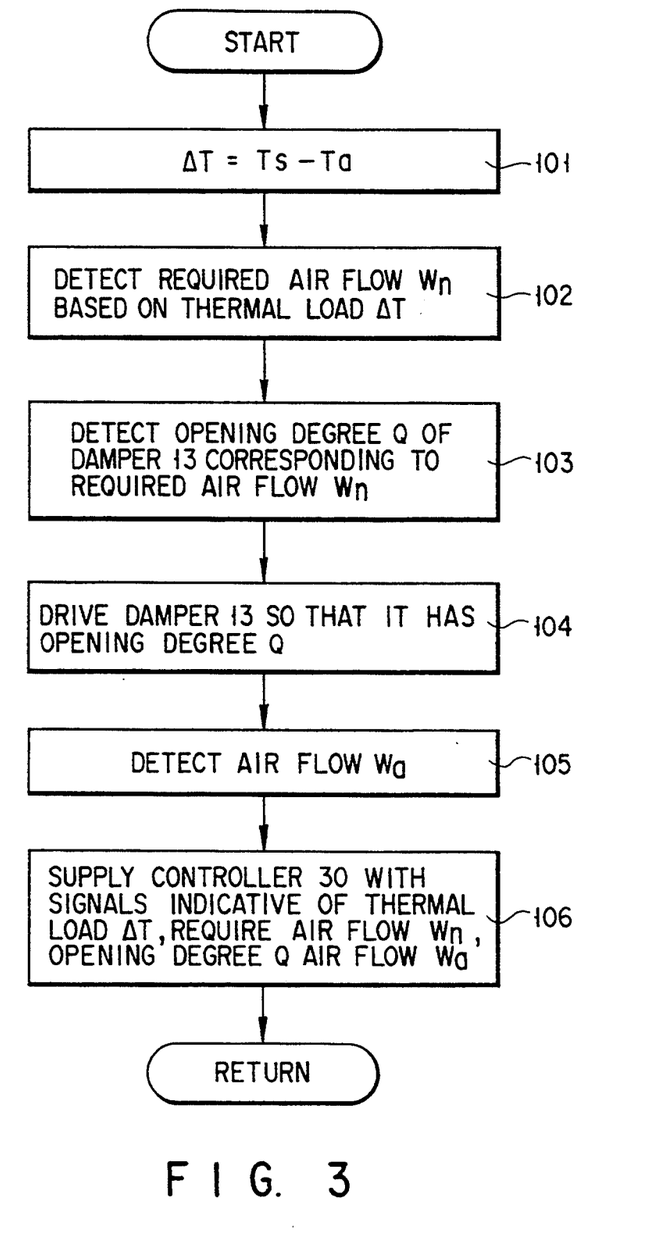
FIG. 3 is a flowchart, useful in explaining the operation of a controller employed on the side of a heat source in the first embodiment.

Each controller 40 performs control in accordance with the flowchart shown in FIG. 3.

Specifically, the difference $\Delta T$ (=Ta−Ts) between a room temperature Ta sensed by the indoor temperature sensor 42 in the operation unit 41 and a desired temperature Ts set by the unit 41 is detected as the thermal load in a room (step 101). The required flow Wn of primarily-conditioned air in the room, i.e., the required air flow Wn, is determined by calculation based on the detected thermal load $\Delta T$ (step 102).

Then, the opening degree Q of the damper 13 corresponding to the determined required air flow Wn is determined (step 103), and the damper 13 is driven so as to have the opening degree Q (step 104).

The higher the thermal load $\Delta T$, the greater the required air flow Wn and the determined opening degree Q. on the other hand, the lower the thermal load $\Delta T$, the less the required air flow Wn and the determined opening degree Q.

The air flow Wa in the air passage 11 is determined on the basis of the output of the air flow sensor 14 (step 105). Signals indicative of the air flow wa, thermal load $\Delta T$, required air flow Wn, and opening degree Q are supplied to the controller 30 (step 106).

Figure 4:
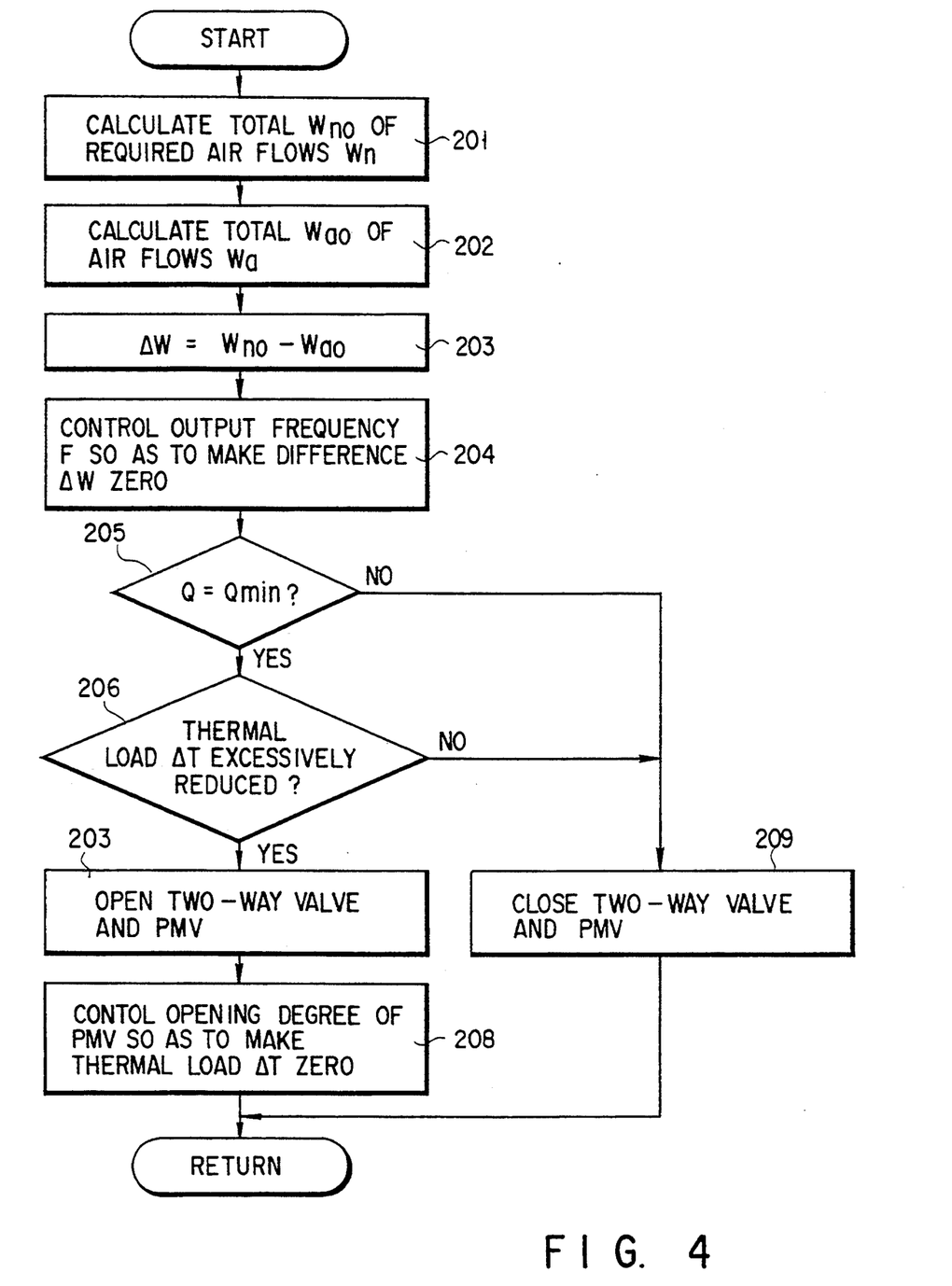
FIG. 4 is a flowchart, useful in explaining the operation of controllers employed on the side of a duct in the first embodiment.

The controller 30 performs control in accordance with the flowchart shown in FIG. 4.

The total Wno of the required air flows wn detected by all the controllers 40 is calculated (step 201), and the total Wao of the air flows Wa detected by all the controllers 40 is calculated (step 202).

The difference $\Delta W$ (=who−Wao) between the total required air flow Wno and the total air flow Wao is calculated (step 203), and the speed of the indoor fan 6 (i.e., the output frequency F of the inverter 8) is controlled so as to cause the difference $\Delta SW$ to be zero (step 204).

It is determined whether or not the damper opening degrees Q detected by all the controllers 40 include the allowable minimum value Qmin (step 205). If they include the value Qmin, then it is determined whether or not the thermal load $\Delta T$ in a room which has a damper with the opening degree Qmin is excessively being reduced and is lower than zero (step 206).

Suppose that the opening degree Q of the damper 13 corresponding to, for example, the room A is equal to the allowable minimum value Qmin, and at the same time the thermal load $\Delta T$ in the room A is excessively reduced, lower than zero. That is, suppose that the temperature Ta in the room A is lower than the set temperature Ts, i.e., the room A is in an excessively-cooled state.

In this case, as is shown in FIG. 2, the two-way valve 63 and PMV 61 corresponding to the room A are opened (step 207). In the figure, the open state of the valves is marked in white, and the closed state is marked in black.

When the two-way valve 63 is opened, part of refrigerant gas discharged from the compressor 21 flows via the valve 63 into the air heat exchanger 15a, where the heat of the gas is absorbed by air passing through the exchanger 15a, and the gas becomes liquid. That is, primarily-conditioned air having passed through the damper 13 is additionally heated by the air heat exchanger 15a serving as a condenser, and is blown into the room A.

The refrigerant liquid having passed through the air heat exchanger 15a unites with other flows of refrigerant into the indoor heat exchanger 5 via the PMV 61.

The opening degree of the PMV 61 is controlled to cause the thermal load $\Delta T$ in the room A to become zero (step 208). In other words, the flow of refrigerant into the air heat exchanger 15a is controlled to vary the amount of heat applied to the primarily-conditioned air, so as to prevent an excessive reduction in thermal load $\Delta T$ in the room A.

Thus, the temperature of air blown into the room A is corrected to increase to a desired extent. Therefore, the room A is prevented from being excessively cooled, and the inhabitant(s) therein will have no bad feelings.

Thereafter, when the opening degree Q of the damper 13 becomes higher than the allowable minimum value Qmin, the two-way valve 63 and PMV 61 are closed (step 209). At this time, flow of refrigerant into the air heat exchanger 15a is stopped, terminating temperature correction of the primarily-conditioned air.

Then, suppose that the operation unit 31 selects the heating operation mode, thereby setting a desired blown-air temperature and starting operation of the air conditioning apparatus.

Figure 5:
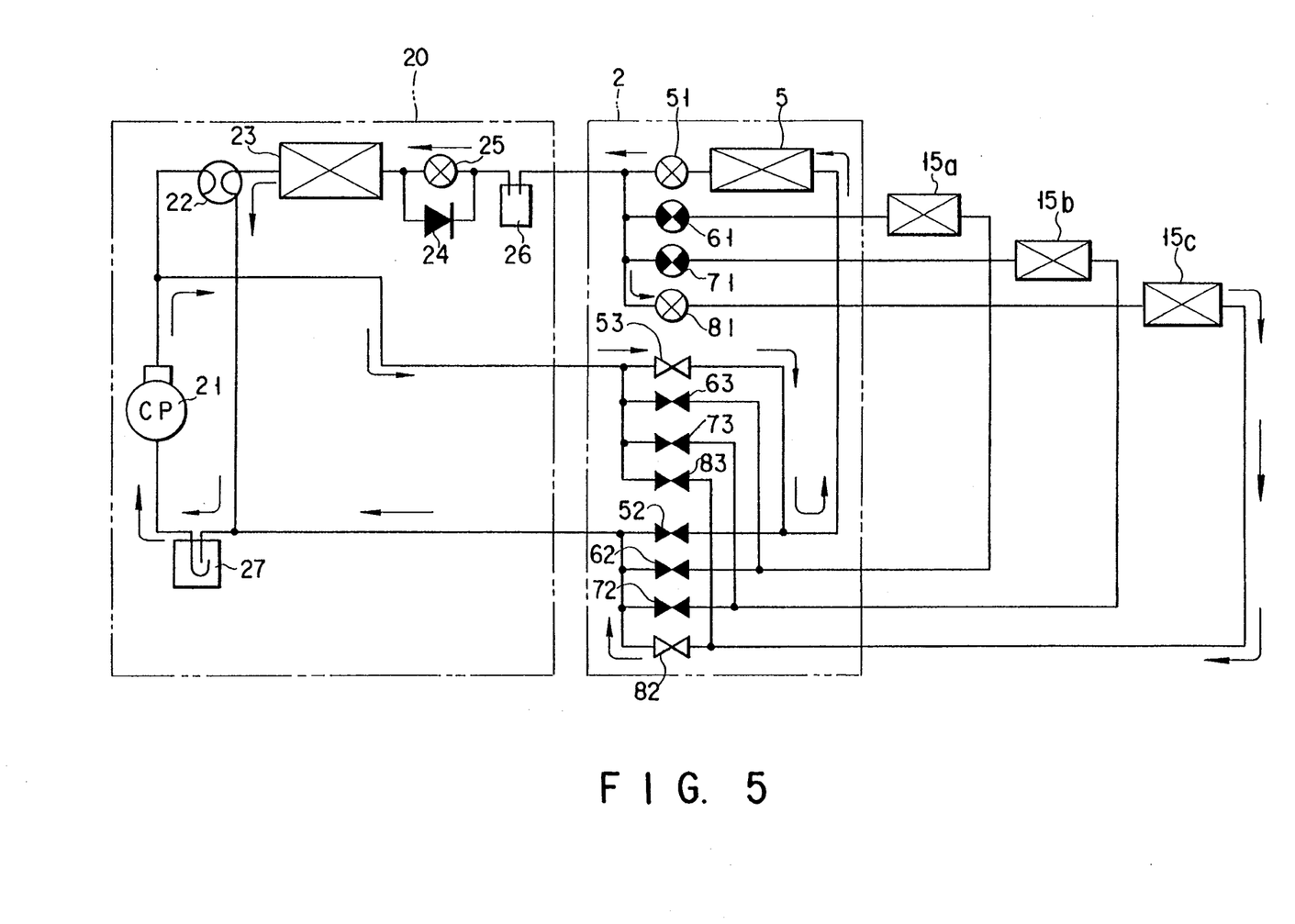
FIG. 5 is a flowchart, useful in explaining the flow of a refrigerant during heating in a refrigerating cycle employed in first and second embodiments.

At this time, the outdoor unit 20 and indoor unit 2 start to operate, and the four-way valve 22 is changed to cause refrigerant to flow in a direction indicated by the arrow in FIG. 5, thereby effecting heating operation. Refrigerant gas is discharged from the compressor 21 and flows into the indoor heat exchanger 5 via the four-way valve 22 and two-way valve 53. In the exchanger 5, heat of refrigerant gas is absorbed by the air in the room, and hence the gas condenses.

The condensed refrigerant, i.e., refrigerant liquid, from the indoor heat exchanger 5 flows into the outdoor heat exchanger 23 via the PMV 51, liquid tank 26, and expansion valve 25. In the outdoor heat exchanger 23, the refrigerant liquid absorbs heat of the ambient air and evaporates. The evaporated refrigerant, i.e., refrigerant gas is sucked into the compressor 21 via the four-way valve 22 and accumulator 27.

Thus, heated air is blown as primarily-conditioned air from the air outlet 4 of the indoor unit 2, and distributed into the rooms A, B, and C through the duct 10.

The temperature of the air blown out of the indoor unit 2 is sensed by the temperature sensor 7, and the difference between the sensed temperature and a desired blown-air temperature set by the operation unit 31 is determined as the total thermal load. The capacity of the compressor 21 (i.e., the output frequency of the inverter circuit 29) is controlled based on the determined total thermal load, thereby varying the blown-air temperature toward the set temperature.

Each controller 40 performs control in accordance with the flowchart shown in FIG. 3.

First, the difference $\Delta T$ (=Ts−Ta) between the set temperature Ts of the operation unit 41 and the detection temperature (room temperature) Ta of the indoor temperature sensor 42 provided in the unit 41 is detected as the thermal load (step 101). The required air flow Wn in the room is calculated based on the detected thermal load $\Delta T$ (step 102).

The opening degree Q of the damper 13 which corresponds to the calculated required air flow Wn is determined (step 103), and the damper 13 is driven to have the determined value (step 104).

The higher the thermal load $\Delta T$, the greater the required air flow Wn and the set opening degree Q of the damper 13. On the other hand, the lower the thermal load $\Delta T$, the less the required air flow wn and the set opening degree Q of the damper 13.

The air flow Wa in the air passage 11 is determined on the basis of the output of the air flow sensor 14 (step 105). Signals indicative of the air flow wa, thermal load $\Delta T$, required air flow Wn, and opening degree Q are supplied to the controller 30 (step 106).

The controller 30 performs control in accordance with the flowchart shown in FIG. 4.

The total Wno of the required air flows Wn detected by all the controllers 40 is calculated (step 201), and the total Wao of the air flows Wa detected by all the controllers 40 is calculated (step 202).

The difference $\Delta W$ (=Wno−Wao) between the total required air flow Wno and the total air flow wao is calculated (step 203), and the speed of the indoor fan 6 (i.e., the output frequency F of the inverter 8) is controlled so as to cause the difference $\Delta SW$ to be zero (step 204).

It is determined whether or not the damper opening degrees Q detected by all the controllers 40 include the allowable minimum value Qmin (step 205). If they include the value Qmin, then it is determined whether or not the thermal load $\Delta T$ in a room which has a damper with the opening degree Qmin is excessively being reduced and is lower than zero (step 206).

Suppose that the opening degree Q of the damper 13 corresponding to, for example, the room C is equal to the allowable minimum value Qmin, and at the same time the thermal load $\Delta T$ in the room C is excessively reduced, lower than zero. That is, suppose that the temperature Ta in the room C is higher than the set temperature Ts, i.e., the room C is in an excessively-heated state.

In this case, as is shown in FIG. 5, the two-way valve 82 and PMV 81 corresponding to the room C are opened (step 207). In the figure, the open state of the valves is marked in white, and the closed state is marked in black.

Thus, part of refrigerant liquid having passed through the outdoor heat exchanger 5 and PMV 51 flows via the PMV 81 into the air heat exchanger 15c, where it absorbs heat of air passing through the exchanger 15c, and evaporates. That is, primarily-conditioned air having passed through the damper 13 is additionally cooled by the air heat exchanger 15c serving as a evaporator, and is blown into the room C.

The refrigerant gas having passed through the air heat exchanger 15c unites with other flows of refrigerant into the accumulator 27 and compressor 21 via the two-way valve 82. The opening degree of the PMV 81 is controlled to cause the thermal load $\Delta T$ in the room C to become zero (step 208). In other words, the flow of refrigerant into the air heat exchanger 15c is controlled to vary the amount of cooling applied to the primarily-conditioned air, so as to release the excessive reduction of the thermal load $\Delta T$ in the room C.

Thus, the temperature of air blown into the room C is corrected to decrease to a desired extent. Therefore, the room C is prevented from being excessively heated, and the inhabitant(s) therein will have no bad feelings.

Thereafter, when the opening degree Q of the damper 13 becomes higher than the allowable minimum value Qmin, the PMV 81 and two-way valve 82 are closed (step 209). At this time, flow of refrigerant into the air heat exchanger 15c is stopped, terminating temperature correction of the primarily-conditioned air.

Then, the second embodiment of the invention will be explained.

Figure 6:
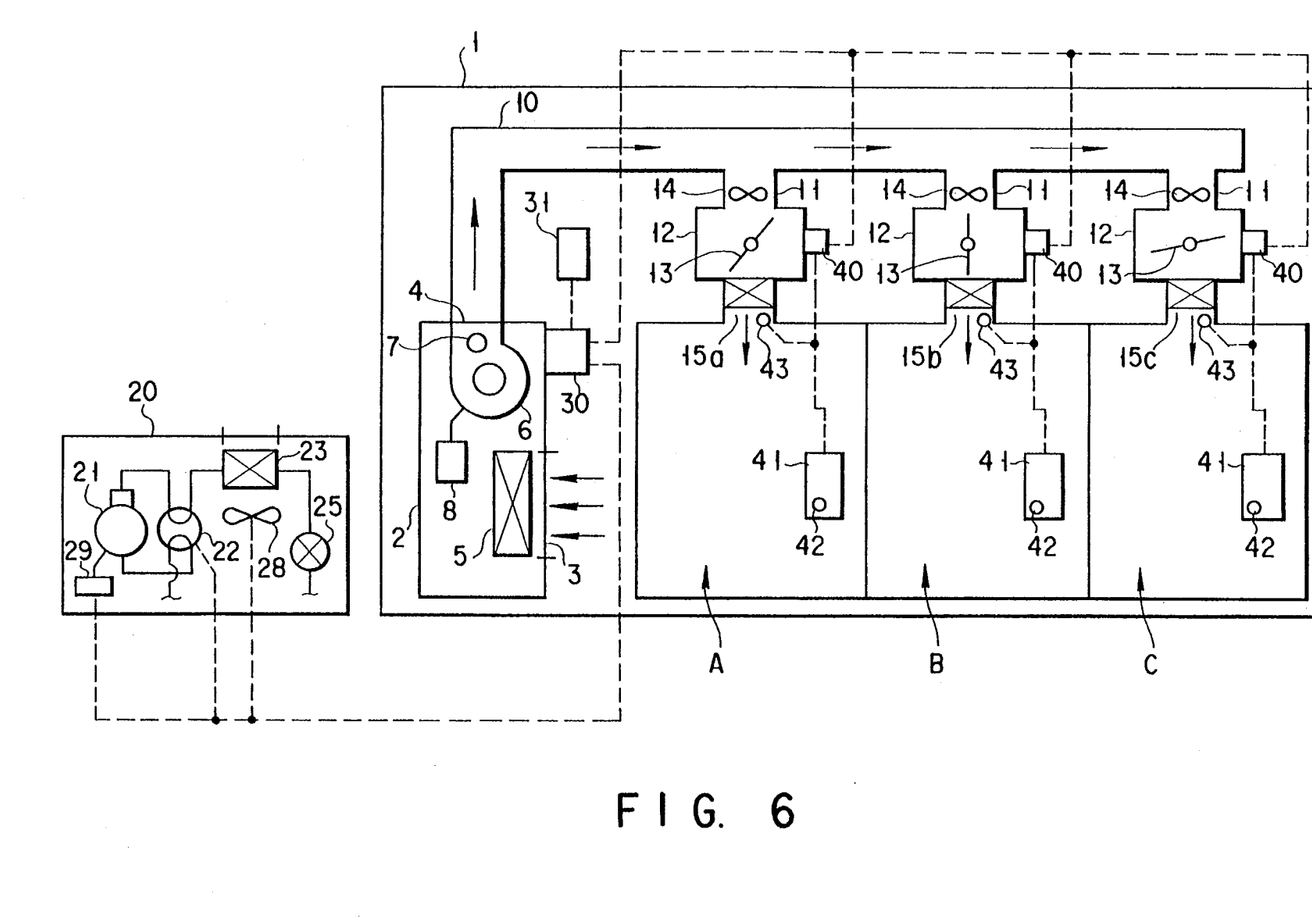
FIG. 6 is a diagram, showing the entire arrangement of an apparatus according to a second embodiment.

As is shown in FIG. 6, temperature sensors 43 are provided in the air passages 11 downstream of the air heat exchangers 15a–15c, respectively.

Each controller 40 has the following function means:

[1] First detection means for detecting, as a thermal load, the difference $\Delta T$ between a set temperature Ts set by the operation unit 41 a detection temperature (room temperature) Ta detected by the indoor temperature sensor 42. Calculation of $\Delta T = Ta - Ts$ is performed during cooling, whereas calculation of $\Delta T = Ts - Ta$ is performed during heating.

[2] Second detection means for calculating the required flow Wn of the primarily-conditioned air in a room on the basis of the thermal load $\Delta T$ detected by the first detection means.

[3] Third detection means for detecting the opening degree Q of the damper 13 corresponding to the required air flow Wn detected by the second detection means.

[4] Driving means for driving the damper 13 so as to make the opening degree thereof equal to the value Q detected by the third detection means.

[5] Opening degree limiting means for limiting the opening degree of the damper 13 so that the opening degree will not become lower than the allowable minimum value Qmin.

[6] Fourth detection means for detecting the flow Wa of air in the air passage 11 on the basis of the output of the air flow sensor 14.

[7] Transmission means for transmitting to the controller 30 the detected thermal load $\Delta T$, required air flow Wn, opening degree Q, air flow wa, and detection temperature (blown-air temperature) Tw of the temperature sensor 43.

The controller 30 has the following function means:

[1] Control means for controlling, on the basis of operation of the operation unit 31, operation of the compressor 21 (driving the inverter 29), operation of the outdoor fan 28, changeover of the four-way valve 22, and operation of the indoor fan 6 (driving the inverter 8).

[2] Detection means for detecting, as a total thermal load, the difference between a blown-air temperature set by the operation unit 31 and a detection temperature detected by the temperature sensor 7.

[3] Control means for controlling the capacity of the compressor 21 (i.e., the frequency of the output of the inverter circuit 29) on the basis of the detected total thermal load.

[4] Calculation means for calculating the sum Wno of the required air flows Wn determined by the controllers 40.

[5] Calculation means for calculating the sum wao of the air flows determined by the controllers 40.

[6] Calculation means for calculating the difference $\Delta W$ (=Wno−Wao) between the calculated total required air flow Wno and total air flow Wao.

[7] Control means for controlling the speed of the indoor fan 6 (i.e., the output frequency F of the inverter 8) so as to make the difference $\Delta W$ zero.

[8] Control means for operating when any opening degree(s) detected by the controllers 40 is the allowable minimum value Qmin, to flow refrigerant into the air heat exchanger 15a, 15b, or 15c of a room having the value Qmin. That is, the exchangers 15a–15c serve to correct the temperatures in the rooms.

[9] Set-value renewal means for setting a set value Tws lower or higher by a predetermined value a than the present detection temperature Tw of the temperature sensor 43 corresponding to the air heat exchanger 15a, 15b, or 15c into which refrigerant flows, and renewing the set value Tws by the predetermined value a each time a time period tl elapses. The predetermined α is a positive value during cooling operation, and a negative value during heating operation.

[10] Control means for controlling the flow of refrigerant into the air heat exchangers 15a, 15b, or 15c so as to make the detection temperature Tw of the temperature sensor 43 corresponding to the exchanger, equal to the set value Tws.

The refrigerating cycle and other structures are identical to those in the first embodiment.

The operation of the above-described structure will be explained.

Figure 7:
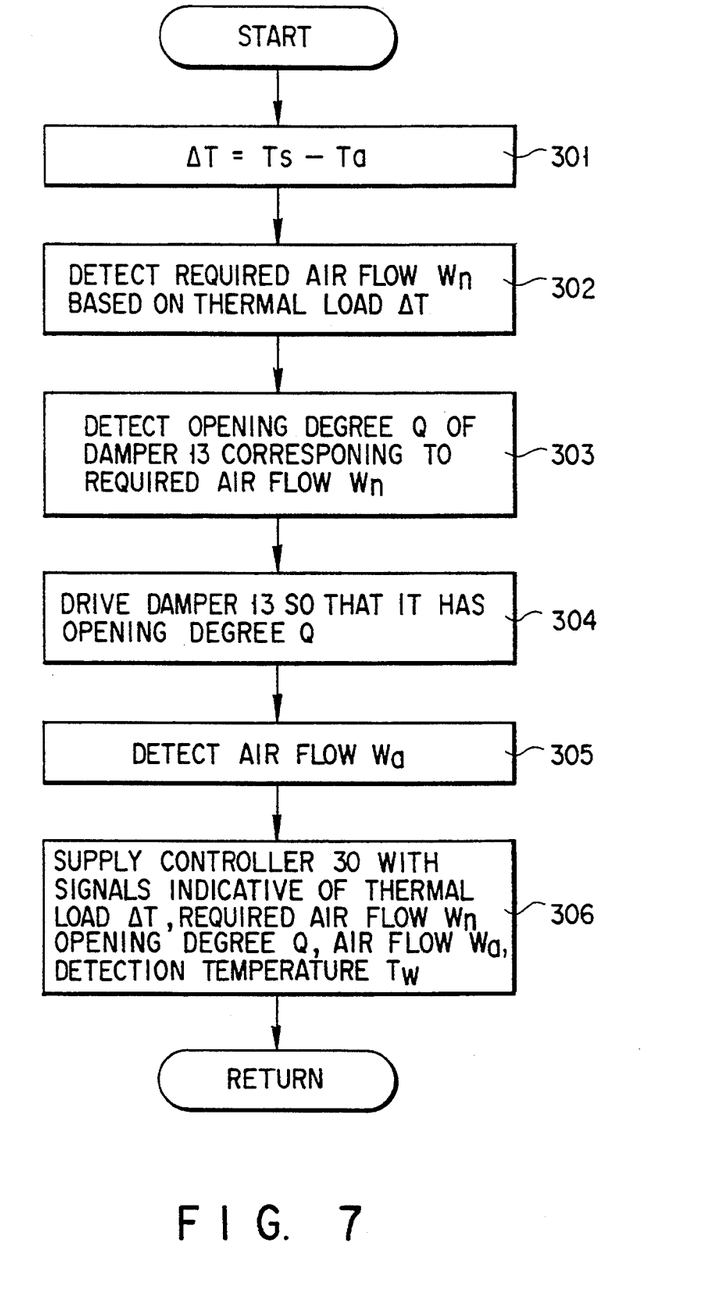
FIG. 7 is a flowchart, useful in explaining the operation of controllers employed on the side of an air flow control unit in the second embodiment.

Each controller 40 operates in accordance with the flowchart of FIG. 7.

The difference ΔT (=Ta−Ts) between the detection temperature (room temperature) Ta of the indoor temperature sensor 42 in the operation unit 41 and the set temperature Ts of the operation unit 41 is detected as the thermal load (step 301). The required flow Wn of primarily-conditioned air in a room, i.e., required air flow Wn, is calculated based on the detected thermal load ΔT (step 302).

Then, the opening degree Q of the damper 13 corresponding to the determined required air flow wn is determined (step 303), and the damper 13 is driven so as to have the opening degree Q (step 304).

The higher the thermal load ΔT, the greater the required air flow Wn and the opening degree Q of the damper 13. On the other hand, the lower the thermal load ΔT, the less the required air flow Wn and the opening degree Q of the damper 13.

The air flow Wa through the air passage 11 is determined on the basis of the output of the air flow sensor 14 (step 305). The controller 30 is informed of the air flow Wa, thermal load ΔT, required air flow wn, opening degree Q, and detection temperature Tw of the temperature sensor 43 (step 306).

Figure 8:
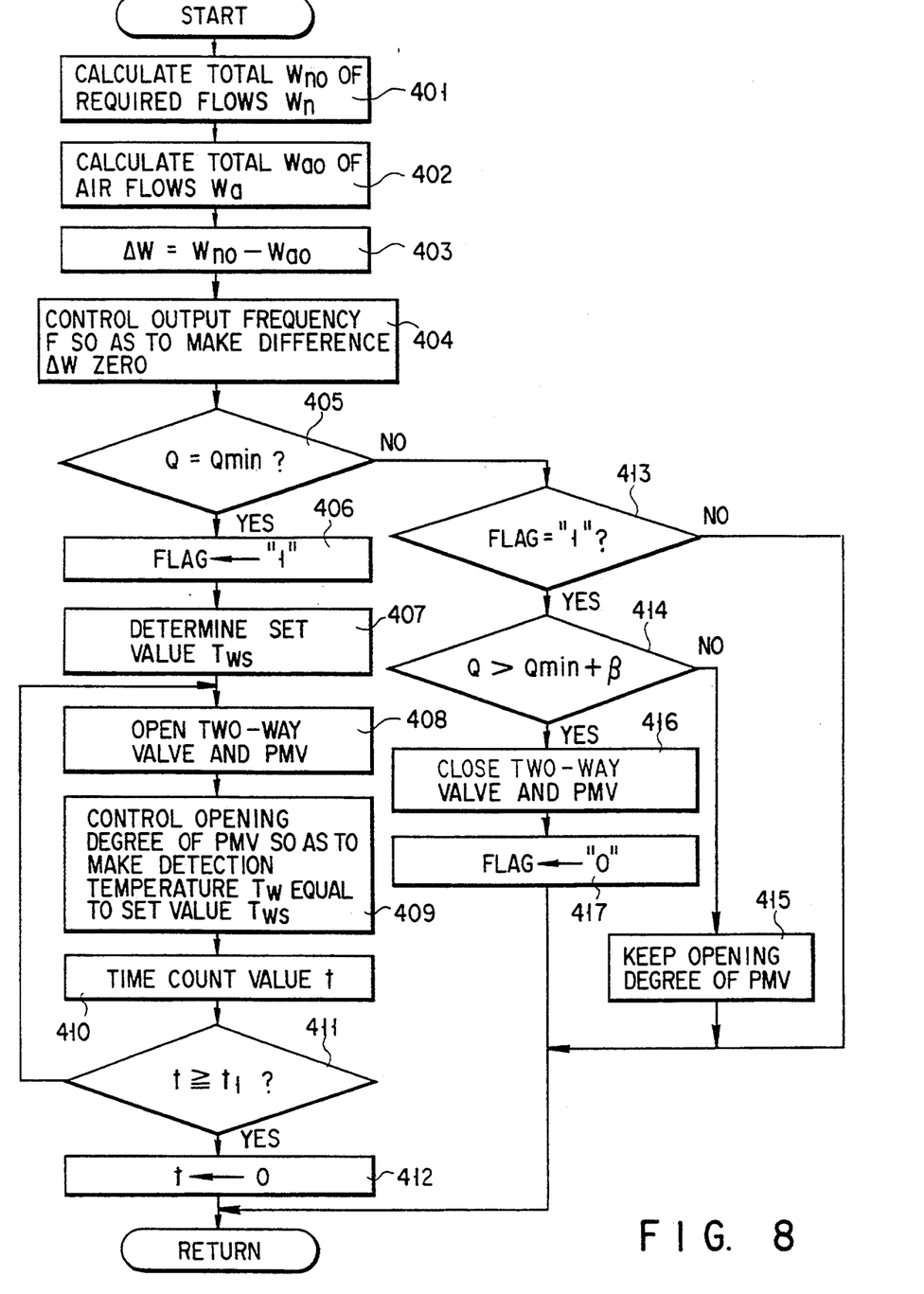
FIG. 8 is a flowchart, useful in explaining the operation of a controller employed on the side of a heat source in the second embodiment.

The controller 30 operates in accordance with the flowchart of FIG. 8.

The total Wno of the required air flows Wn detected by all the controllers 40 is calculated (step 401), and the total wao of the air flows Wa detected by all the controllers 40 is calculated (step 402).

The difference ΔW (=Wno−Wao) between the total required air flow Wno and the total air flow Wao is calculated (step 403), and the speed of the indoor fan 6 (i.e., the output frequency F of the inverter 8) is controlled so as to cause the difference ΔSW to be zero (step 404).

It is determined whether or not the damper opening degrees Q detected by all the controllers 40 include the allowable minimum value Qmin (step 405).

If the damper 13 corresponding to the room A has the allowable minimum opening degree Qmin, the flag for indicating that temperature correction should be performed is set to "1" (step 406), and then a value higher or lower by a predetermined value a than the present detection temperature (blown-air temperature) of the temperature sensor 43 corresponding to the room A is determined as the set value Tws (step 407). That is, during cooling operation, a value higher by a predetermined value a than the present detection temperature Tw of the temperature sensor 43 corresponding to the room A is determined as the set value Tws (=Tw+α).

On the other hand, during heating operation, a value lower by a predetermined value α than the present detection temperature Tw of the temperature sensor 43 corresponding to the room Aid determined as the set value Tws (=Tw−α).

Then, the two-way valve 63 and PMV 61 corresponding to the room A are opened (step 408), as is shown in FIG. 2.

When the two-way valve 63 is opened, part of refrigerant gas discharged from the compressor 21 flows via the valve 63 into the air heat exchanger 15a, where the heat of the gas is absorbed by the air passing therethrough, and condenses into a liquid. Thus, primarily-conditioned air having passed the damper 13 is additionally heated by the air heat exchanger 15a serving as a condenser, and is blown into the room A.

Refrigerant liquid from the air heat exchanger 15a passes through the PMV 61 and unites with other flows of refrigerant into the indoor heat exchanger 5. The opening degree of the PMV 61 is controlled so as to cause the detection temperature Tw of the temperature sensor 43 to become equal to the set value Tws (step 409). Thus, the temperature of the air blown into the room A is increased by the predetermined value α during cooling operation, whereas it is reduced by the predetermined value a during heating operation.

During temperature correction, time counting is performed (step 410). If the count value t reaches a predetermined value t₁ (i.e., if the answer to the question of a step 411 is YES), it is cleared (t=0, step 412).

If the opening degree Q of the damper 13 corresponding to the room A does not become higher than the allowable minimum value irrespective of that temperature correction is performed for a predetermined time period t₁, the set value Tws is renewed to a value higher or lower by the predetermined value a than the present value (step 407). That is, the set value Tws is renewed to a value (Tws=Tws+α) higher by the predetermined value α than the present value during cooling operation, whereas it is renewed to a value (Tws=Tws−α) lower by the predetermined value α than the present value during heating operation. Thus, temperature correction is repeated on the basis of the renewed set value Tws (steps 408–412).

Accordingly, the room temperature Ta can be prevented from becoming lower than the set temperature Ts during cooling operation, thereby imparting no bad feelings to the inhabitant(s) of the room A. Similarly, the room temperature Ta can be prevented from becoming higher than the set temperature Ts during heating operation, thereby imparting no bad feelings to the inhabitant(s) of the room A.

When the opening degree Q of the damper 13 corresponding to the room A becomes higher than the allowable minimum value Qmin, it is determined whether or not the flag is set at "1" (step 413), i.e., whether or not temperature correction has been carried out.

If the flag is set at "1" (if the answer to the question of the step 413 is YES), it is determined whether or not the opening degree Q of the damper 13 corresponding to the room A reaches a value higher by a predetermined value β than the allowable minimum value Qmin (step 414).

If the opening degree Q does not reach the value (Qmin+β), i.e., if the answer to the question of the step 414 is NO, the opening degree of the PMV 61 is maintained as it is (step 415).

If, on the other hand, the opening degree Q reaches the value (Qmin+β), i.e., if the answer to the question of the step 414 is YES, the opening degree of the two-way valve 63 and PMV 61 are closed (step 416), and the flag is set to "0" (step 417).

when the two-way valve 63 and PMV 61 are closed, flow of refrigerant into the air heat exchanger 15a is stopped, terminating the temperature correction of primarily-conditioned air.

Though three rooms are employed in the above-described embodiments, the number of rooms is not limited to three.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. An air conditioning apparatus for distributing primarily-conditioned air to a plurality of rooms, comprising:

a heat source for discharging the primarily-conditioned air;

an air duct for distributing the primarily-conditioned air which has been discharged from the heat source;

a plurality of air passages, each diverging from the air duct into a corresponding one of the rooms;

a plurality of dampers, each disposed in a corresponding one of the air passages, each for adjusting an amount of the primarily-conditioned air distributed into the corresponding one of the rooms by varying an opening degree;

opening degree-limiting means for limiting the opening degree of each damper to a corresponding value which is not less than a corresponding allowable minimum value;

first detection means for detecting a thermal load in each room;

second detection means for detecting a required flow of the primarily-conditioned air in each room on the basis of the thermal loads detected by the first detection means;

first control means for controlling the opening degree of each damper on the basis of the required flow detected by the second detection means;

a compressor, disposed in the heat source, for compressing, and discharging a refrigerant;

an outdoor heat exchanger, disposed in the heat source, for performing heat exchange between the refrigerant and outdoor air;

an indoor heat exchanger, disposed in the heat source, for performing heat exchange between the refrigerant and indoor air, the indoor heat exchanger being connected with the compressor and the outdoor heat exchanger, thereby forming a refrigeration cycle;

a plurality of air heat exchangers, each disposed in one of the air passages, each for performing temperature adjustments and heat exchange between the refrigerant and the primarily-conditioned air distributed to the corresponding one of the rooms; the air heat exchangers being connected in parallel with the indoor heat exchanger;

second control means for returning the refrigerant discharged by the compressor, back to the compressor via the outdoor heat exchanger and the indoor heat exchanger, thereby performing a cooling operation;

third control means for controlling the refrigerant discharged by the compressor, thereby causing the refrigerant to flow into the air heat exchangers, and for controlling the refrigerant flow through the air heat exchangers so as to form a refrigerant flow toward the indoor heat exchanger when the open degree of at least one of the dampers is at the corresponding allowable minimum value during the cooling operation and a corresponding one of the thermal loads detected by the first detection means is in an excessive reduction state;

pressure-reducing means for reducing a pressure of the refrigerant discharged by the compressor during a heating operation;

fourth control means for returning the refrigerant discharged by the compressor, back to the compressor via the indoor heat exchanger, the pressure-reducing means, and the outdoor heat exchanger, thereby performing the heating operation;

fifth control means for controlling the refrigerant via the indoor heat exchanger so as to cause the refrigerant to flow into the air heat exchangers, and for controlling the refrigerant via the air heat exchangers so as to cause the refrigerant to return to the compressor when the open degree of at least one of the dampers is at the corresponding allowable minimum value during the heating operation and a corresponding one of the thermal loads detected by the first detection means is in the excessive reduction state; and sixth control means for controlling an amount of the refrigerant flowing through the air heat exchangers so that the thermal loads detected by the first detection means are zero during one of the heating operation and the cooling operation.

2. The apparatus according to claim 1, wherein the allowable minimum opening degree of each damper is a minimum value required for supplying air of an amount necessary so as to ventilate each room.

* * * * *